April 20, 1954
J. H. KYLE
2,676,315
LUBRICATION SAFETY DEVICE
Filed Dec. 31, 1949
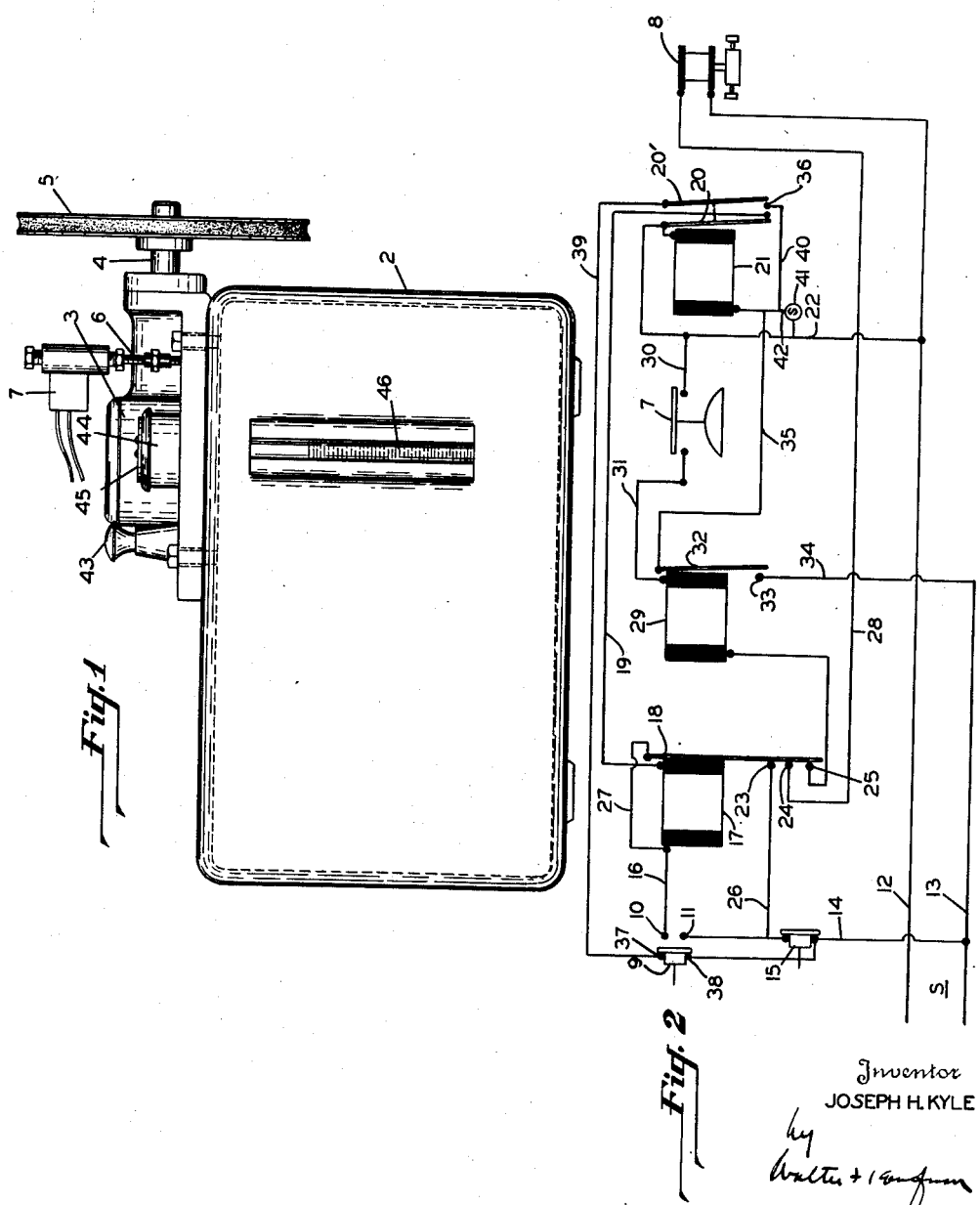
Inventor
JOSEPH H. KYLE
Attorney Patented Apr. 20, 1954

2,676,315

UNITED STATES PATENT OFFICE 2,676,315

LUBRICATION SAFETY DEVICE

Joseph H. Kyle, Lancaster, Pa., assignor to Armstrong Cork Company, Lancaster, Pa., a corporation of Pennsylvania Application December 31, 1949, Serial No. 136,333

3 Claims. (Cl. 340—270)

This invention relates to a lubrication safety device and is directed more particularly to a safety device for use in combination with lubricators which are effective for supplying metered quantities of lubricant at predetermined intervals. This type of lubricator is commonly employed on machines and is effective for supplying lubricant to the various moving parts requiring the same under pressure and at regular intervals. The pressure is at its maximum during the delivery stroke and gradually diminishes during the intervals between such strokes to a lower pressure and, in some instances, to zero, thus making it impractical to utilize a conventional pressure switch which would stop the machine whenever the pressure drops below a predetermined safe minimum. It is sometimes desirable to apply lubricant prior to starting the machine, and for that purpose lubricators of the type referred to are generally provided with a hand pump which may be actuated to supply the lubricant under pressure to the moving parts before the machine is started. With lubricating systems of this type, it is not always possible to detect faulty operation of the pump or a break in the feed lines which convey the lubricant from the pump to the parts to be lubricated. Carelessness may also result in an inadequate supply of lubricant to the pump. As a result, expensive machines are damaged through lack of lubrication or insufficient lubrication which has not been promptly detected.

It is an object of this invention to provide a safety device which will be effective for preventing operation of a machine supplied with lubricant in the event the pump should fail, a feed line break, the supply of lubricant to the pump be exhausted, or other accident occur which reduces the pressure of the lubricant in the feed lines at the delivery stroke of the lubricant pump and results in improper lubrication or the absence of lubricant.

Another object of my invention is to provide a safety device for use with lubrication systems of the intermittent feed type which will prevent operation of the machine to be lubricated prior to the establishment of a proper supply of lubricant under pressure to the parts to be lubricated.

Generally stated, the device includes a pressure switch located on the lubrication feed line, which switch is actuated upon the reduction of the pressure in the feed line to a predetermined low point, and electrical means for stopping the machine in the event the switch is closed.

The invention will be described in conjunction with the attached drawing in which:

Figure 1 is an elevational view illustrating an embodiment of the present invention; and Figure 2 is a diagrammatical view of the electrical circuit for carrying out the invention.

Referring to the drawings, there is shown a lubricant reservoir 2 which has mounted thereon a pump 3. The pump has an operating shaft 4 upon which is mounted a pulley 5 which may be connected by a belt (not shown) to a pulley on the machine to be lubricated, or the pump 3 may be driven by a separate motor. The pump 3 may be a standard Bijur cyclic pump and, as a typical example, may be adjusted to deliver 2 cubic centimeters of lubricant on each stroke, and may be set so as to deliver such quantity once every 1½ minutes. The particular cycle of the pump and the quantity of lubricant supplied will vary depending upon the requirements of the machine to be lubricated. The structure of the pump is not important and may be a cam-actuated piston type pump such as the Bijur cyclic pump mentioned above. Other types of pumps which supply lubricant intermittently may be substituted.

The discharge of the pump is through a feed line 6 which conveys the lubricant to the part or parts of the machine to be lubricated. Located on the feed line 6 is a pressure switch 7 which is actuated by the pressure of the lubricant in the feed line 6. For convenience of illustration, this pressure switch is shown immediately above the pump 3. However, it will be understood that the pressure switch 7 may be located at any point along the feed line 6. The pressure switch 7 is adjustable and, in the typical example, may be adjusted so that it will be actuated when the pressure of the lubricant in line 6 drops below five pounds per square inch.

Figure 2 is an electrical circuit diagram for the operating and control system for stopping the machine in the event of a failure of the pressure in the lubricating line for a prolonged period. In the embodiment illustrated the machine is controlled by a clutch (not shown) which is actuated pneumatically through a pneumatic solenoid valve 8, which upon energization opens the line for the supply of air which actuates the clutch mechanism, and the press is brought into operation. De-energization of the solenoid valve 8 causes the clutch to be disengaged, and the machine stops.

In normal operation of the machine, a start button 9 of a magnetic switch is pressed inwardly making contact across contact points 10 and 11. This completes the primary circuit from the main current source and conductors 12 and 13. The circuit is from conductor 13 through conductor 14, a stop control switch 15, contact points 10 and 11, and conductor 16 to the one side of a relay 17. Relay 17 is also connected to the armature 18 of relay 17 by a lead 27. The other side of the relay 17 is connected to the conductor 12 by lead 19, armature 20 of a control relay 21, and a lead 22 when relay 21 is in its normally de-energized position as shown in Figure 2. Thus with relay 21 in its normally open position and switch 9 closed, the circuit for relay 17 will be completed; and armature 18 of relay 17 will be brought into engagement with contact points 23, 24, and 25.

Contact point 23 is connected by a lead 26 to conductor 14, and this completes the circuit for relay 17 through the lead 26, armature 18, and lead 27, thereby by-passing magnetic switch 9 which may immediately assume its normal open position as shown in Figure 2.

Contact point 24 is connected by lead 28 to the one side of the solenoid valve 8. The other side of the solenoid valve 8 is connected directly to the conductor 12. When relay 17 is closed, the circuit for solenoid valve 8 is completed, and thus the valve 8 is energized and open during normal operation of the machine.

Contact point 25 is connected to one side of a time delay relay 29. This time delay relay is preferably set for three minutes so as to lift its armature after energization. This relay is controlled by pressure switch 7. Upon failure of the lubrication system causing a pressure drop on the lubricant in the system, the pressure switch 7 which is held open by the pressure in the lubricant line will automatically close. This should preferably be set to occur at five pounds' pressure per square inch. That is to say that in the event the pressure in the line drops to five pounds per square inch, the pressure switch 7 will automatically close and will remain closed until a pressure of five pounds or more is attained in the feed line. The closing of pressure switch 7 completes the circuit for time delay relay 29 from line 12 through lead 30, switch 7, and lead 31. When thus energized, time delay relay will lift its armature 32 at the end of its three-minute delay cycle. When armature 32 is brought into engagement with contact point 33 by reason of failure of pressure in the fuel line, the circuit for control relay 21 is completed from line 13 through lead 34, armature 32, and a lead 35 connected to one side of relay 21. The other side of relay 21 is connected by lead 22 to line 12 as previously described. When relay 21 is energized, the circuit for control relay 17 is opened. This breaks contact points 23, 24, and 25; time delay relay 29 is de-energized; and solenoid valve 8 is de-energized and automatically closes. This disengages the clutch and arrests rotation of the machine.

Relay 21 is a double armature relay; and as explained earlier, it is normally open so that the armature 20 closes the circuit to the one side of relay 17. Upon closing of the relay 21 the armature 20′ engages a contact point 36 closing the circuit from conductor 13 through conductor 14; the back contacts 37 and 38 of start button 9, lead 39, armature 20′, contact point 36, and lead 40 to the same side of relay 21 as is connected to lead 35 from the armature 32 of time delay relay 29. This circuit interlocks control relay 21 and holds the same in closed position after main relay 17 and time delay relay 29 have been de-energized.

A signal light 41 is provided which is connected to relay 21 by means of lead 42. The other side of the signal light 41 is connected to lead 22, completing the signal light circuit. With this arrangement the signal light 41 will be lighted as long as relay 21 is energized, indicating to the operator that the machine has stopped because of a failure in the lubrication circuit. In place of the signal light any type of signal, such as a bell, may be used if desired.

Upon failure of the lubrication system which results in the stopping of the machine, the same can be restarted by pressing start button 9 which breaks the interlock on relay 21 by reason of breaking the circuit across back contact points 37 and 38 of start button 9. The breaking of the interlock de-energizes control relay 21 allowing the same to open, thereby closing the circuit to main start relay 17 through armature 20. The circuit to the other side of relay 17 is closed by the start button making contact across points 10 and 11. However, if the failure has not been corrected, pressure switch 7 remains closed and the electrical circuit for time delay relay 29 is completed, causing the same to immediately start its delay cycle. This will allow the machine to run three minutes at which time it will again stop. However, if the pressure has been increased to a point above five pounds per square inch during such three-minute period, the pressure switch 7 will open and the circuit for the time delay relay will be open and continued operation of the machine will be possible.

With high speed production machines, it is not desirable to have a down period of three minutes because of lost production. In most instances minor difficulties with the lubrication system due to failure to keep the supply tank full, minor obstruction in the feed line, or the like can be immediately corrected and the machine may be run continuously without harm. For that reason, it is preferred to have the control arrangement which permits the operator to run the machine for a short period after he has been informed of the presence of difficulty due to failure of the lubrication system.

Positioned on the lubricant reservoir 2 is a hand pump 43 which is adapted to pump lubricant into the feed line 6 in the same manner as the pump 3 supplies lubricant to the feed line 6. This hand pump 43 is essential if the pump 3 is driven by the machine itself inasmuch as it is used to pump lubricant into the line 6 after repairs have been made or when the machine is first put in operation after a shutdown. This is necessary since the time delay relay 29 will stop the machine after it has run its three-minute cycle if the pressure in the lubricating line has not been increased over five pounds per square inch in that period of time.

In order to maintain an adequate supply of lubricant in the reservoir 2, an access opening 44 is provided enclosed by a cover 45, and the supply of lubricant from the reservoir 2 may be replenished as needed through this opening. A glass gauge 46 may be provided in the reservoir 2 for a visual indication of the quantity of oil therein. These are conventional and are standard equipment on the Bijur cyclic pump.

In the operation of the device, assuming that the machine to be lubricated is idle, the hand pump 43 will be actuated and lubricant will be supplied under pressure through the feed line 6 to the parts to be lubricated. When sufficient lubricant has been supplied to the feed line 6 to build up a pressure of five pounds per square inch or greater, the pressure switch 7 will be opened by the pressure of the lubricant acting thereon and the circuit through the time delay relay 29 will be broken. At this time the machine can be started by pushing main start switch 9 which closes the circuit through conductor 14, switch 9, lead 16, to relay 17. The other side of relay 17 is connected by means of lead 19, armature 20, and lead 22 to the other side of the line. This closes the circuit and energizes relay 17. Immediately upon energization of relay 17, the relay closes and the armature 18 thereof engages contact points 23, 24, and 25. Contact point 23 is connected by means of lead 26 to the conductor 14 which closes the circuit around switch 9, permitting the relay 17 to be energized even though button 9 springs back to its original position, breaking the contact between points 10 and 11. Contact point 24 closes the circuit through lead 28 to solenoid valve 8 which actuates the clutch and allows the machine to operate. Contact point 25 is connected to one side of the solenoid 29 of the time delay relay.

Pressure switch 7 which is set at five pounds per square inch will remain open until the pressure drops to five pounds or lower, at which time it closes, closing the electrical circuit through time delay relay 29 allowing the same to start its three-minute cycle. If the pressure is built up to five pounds or greater before the expiration of the three-minute cycle, the pressure switch 7 opens and the relay 29 is de-energized allowing the machine to continue its operation. However, if the pressure does not build up before the expiration of the three-minute cycle, the relay 29 closes causing armature 32 to engage contact point 33 closing the circuit to one side of relay 21. The other side of relay 21 is connected to conductor 12 by means of lead 19. Therefore, the closing of relay 29 energizes relay 21, closing the same and thereby breaking the circuit through relay 17, which causes relay 17 to open, breaking contacts 23, 24, and 25. Energization of relay 21 closes the circuit through signal light 41, and the same is lighted indicating to the operator that the machine has stopped due to a lubrication failure. Since the relay 21 is an interlocking relay, the same remains energized and the signal light remains lighted until the interlock is broken. Breaking the contact 24 de-energizes solenoid 8 which disengages the clutch, and the breaking of contact 25 de-energizes the time delay relay 29. Upon stopping, the machine can be restarted by pressing the button 9 which breaks the interlock on relay 21 and closes the circuit through relay 17. However, if the defect has not been corrected, pressure switch 7 will remain closed and the circuit through the time delay relay 29 is closed, causing the time delay relay to start another three-minute cycle. At the end of three minutes the machine will again stop unless the pressure in the lubricating line has risen to the point where it will open pressure switch 7 in which event the machine will continue to operate.

From the foregoing it will be clear that by this arrangement it is possible to prevent the continuous operation of a machine lubricated by periodical deliveries of lubricant should the pressure within the feed lines at the delivery stroke of the pump fall below a desired minimum adequate to maintain proper lubrication of the machine; and in starting, pressure of the lubricant in the feed lines must be established before continuous operation of the machine is possible.

I claim:

1. A safety device for detecting failure in an intermittent lubricating system, the elements comprising a pressure switch responsive to a predetermined drop in the pressure in the lubrication feed line, a time delay relay which is energized upon the closing of the pressure switch, a main relay which is closed during the normal operation of the device, a control relay to be energized upon the closing of said time delay relay, said control relay upon energization breaking the circuit through the main relay, a signal energized upon the energization of said control relay, an interlock on said control relay to hold the same closed upon energization, and common means for breaking the interlock on said control relay and re-energizing said main relay.

2. In a safety device for detecting failure in an intermittent lubricating system, the elements comprising a pressure switch responsive to a predetermined drop in pressure in the lubrication feed line, a time delay relay energized by the closing of the pressure switch, a control relay energized by the closing of said time delay relay, an interlock on said control relay to hold the same closed upon energization, and means for breaking the interlock on said control relay.

3. A safety device for detecting failure in an intermittent lubricating system, the elements comprising a pressure switch responsive to a predetermined drop in pressure in the lubrication feed line, a time delay relay which is energized by the closing of the pressure switch, a main relay which is closed during the normal operation of the device, a solenoid valve energized by said main relay, a control relay energized by the closing of said time delay relay, said control relay upon energization breaking the circuit through the main relay, an interlock on said control relay to hold the same closed upon energization, and common means for breaking the interlock on said control relay and re-energizing said main relay.

References Cited in the file of this patent

UNITED STATES PATENTS

| Number | Name | Date |
|---|---|---|
| 960,569 | Moon | June 7, 1910 |
| 1,144,101 | Bradbury | June 22, 1915 |
| 2,339,532 | Venable | Jan. 18, 1944 |
| 2,399,171 | Davis | Apr. 30, 1946 |